United States Patent [19]

Mott et al.

[11] Patent Number: 5,011,302

[45] Date of Patent: Apr. 30, 1991

[54] MOTOR VEHICLE HUB AND BEARING WITH INTEGRATED ANTI-LOCK BRAKE SENSOR MOUNTING

[75] Inventors: David M. Mott, Roseville; Frank C. Rosiek, Royal Oak, both of Mich.

[73] Assignee: The Budd Company, Troy, Mich.

[21] Appl. No.: 543,327

[22] Filed: Jun. 25, 1990

[51] Int. Cl.$^5$ .......................... F16C 19/08; G01P 3/48
[52] U.S. Cl. ...................................... 384/448; 310/168; 324/207.25
[58] Field of Search ................. 384/448; 310/168, 155; 324/207.25, 166, 173, 174

[56] References Cited

U.S. PATENT DOCUMENTS

| | | | |
|---|---|---|---|
| 3,487,247 | 12/1969 | Scheffler | 310/168 |
| 3,719,841 | 3/1973 | Ritsema | 310/155 |
| 4,783,180 | 11/1988 | Hayashi | 384/448 |
| 4,864,231 | 9/1989 | Okumura et al. | 384/448 X |

FOREIGN PATENT DOCUMENTS

| | | | |
|---|---|---|---|
| 323789 | 7/1989 | European Pat. Off. | 384/477 |
| 237249 | 9/1989 | Japan | 384/448 |

OTHER PUBLICATIONS

Budd Company Assembly No. 15649176 Drawing 8/87.

Primary Examiner—Thomas C. Hannon
Attorney, Agent, or Firm—Harness, Dickey & Pierce

[57] ABSTRACT

A vehicle hub and bearing assembly which includes a sensor for use with an anti-lock braking system (ABS). The hub and bearing assembly includes a hub which rotates relative to a bearing pack assembly adapted to be mounted to a steering knuckle to other suspension component. A sensor exciter ring is fit onto the hub and rotates with the hub upon wheel rotation. An ABS sensor is mounted directly to specially formed mounting features defined by the projecting mounting flange of the bearing pack. With the sensor being mounted directly to the bearing pack, an accurate radial clearance between the exciter ring and sensor can be provided with a minimal number of assembled components defining the radial clearance. This design provides enhanced control over sensor radial clearance, tends to maintain radial clearance for a longer period of time, and allows radial clearance to be set for the hub and bearing sub-assembly which does not require subsequent adjustment by the motor vehicle manufacturer.

6 Claims, 1 Drawing Sheet

MOTOR VEHICLE HUB AND BEARING WITH INTEGRATED ANTI-LOCK BRAKE SENSOR MOUNTING

BACKGROUND AND SUMMARY OF THE INVENTION

This invention relates to a motor vehicle axle component and particularly to a hub and bearing assembly having an integral mounting provision for an anti-lock brake system (ABS) sensor.

In recent years, anti-lock brake systems are being found on an increasing number of passenger motor vehicles, including light duty trucks. The ABS detects wheel rotation and acts to relieve braking force applied on the vehicle's wheels to prevent a lock-up condition from occurring. Wheel brake locking is undesirable since it results in longer stopping distances and directional instability of the vehicle. Typical ABS designs employ a sensor at each vehicle wheel subject to ABS control. Sensors can detect wheel rotation using various technologies including slotted disk light sensor devices, inductive pick-ups, Hall effect devices variable reluctance sensors, etc. Signals from the wheel rotation sensors are fed into an ABS computer which modulates braking force.

Present sensors typically use some type of exciter ring, slotted disk, or other component that rotates relative to a sensor in response to wheel rotation. For most sensor types and particularly those employing magnetic field coupling between the sensor and exciter ring it is important to maintain a pre-determined relationship or clearance between the component which rotates with the wheel and the sensor during wheel rotation. Numerous designs for prior art ABS sensors require that the sensor unit be calibrated after the hub and wheel assembly is affixed to the vehicle, which imposes significant cost and labor disadvantages. In view of these disadvantages, a vehicle hub and bearing assembly with an ABS sensor in which the alignment or set-up clearance between the components of the sensor system is accurately established and can be set with little or no post-assembly adjustment.

The present invention is related to a hub and bearing assembly designed for light duty truck application, featuring integrated provisions for the mounting of an ABS sensor. The hub and bearing assembly of the present invention enables the relationship, between an ABS sensor, and an exciter ring to be established very accurately during assembly of the hub and bearing unit. By providing an accurate and small clearance between the sensor and exciter ring, a higher electrical output for the sensor is provided. This clearance is set during assembly of the hub and bearing unit and later adjustment is unnecessary. The configuration of the present invention also reduces the number of separate assembled components which affect the radial clearance and relationship between the exciter ring and sensor.

The features of the present invention are achieved through a design feature affixing the exciter ring directly to the rotating hub of the assembly, and attaching the sensor directly to the mounting flange of the bearing pack unit which is mounted to a suspension component.

The hub and bearing assembly of the present invention is a specific improvement over one of assignee's own prior art designs. In that prior art assembly, the ABS sensor was mounted to a separate sensor plate which was attached to the bearing mounting flange. This additional sensor mounting plate component imposed the requirement that an additional part must be manufactured and assembled onto the bearing mounting flange and further complicated the process of alignment and controlling the positioning of the sensor during use.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
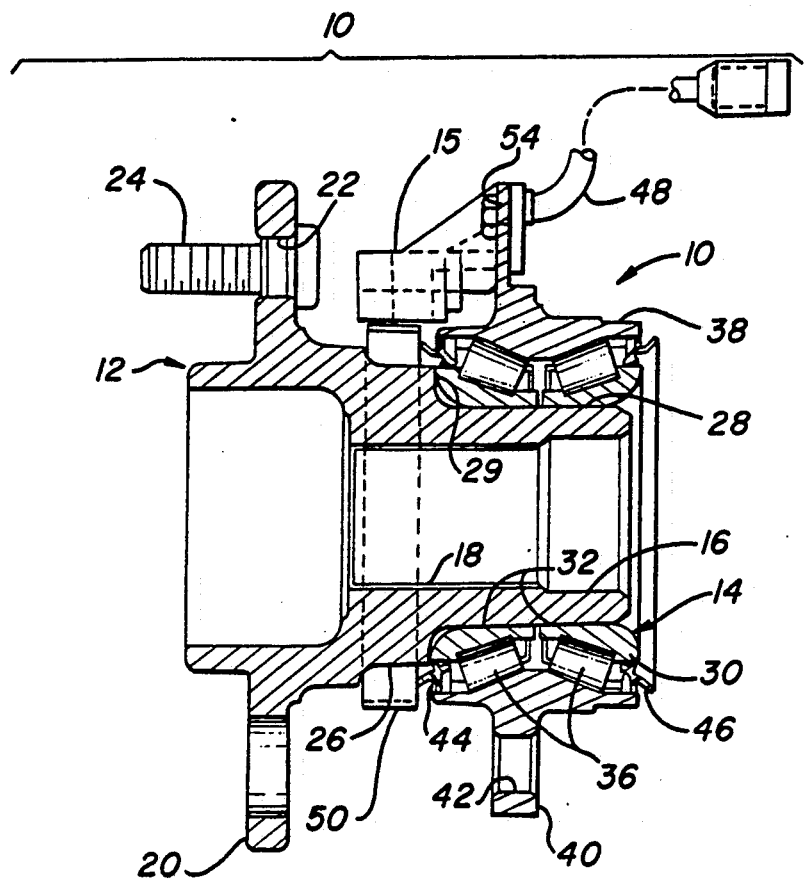
FIG. 1 is a cross-sectional view of a hub and bearing assembly in accordance with the present invention.

A motor vehicle hub and bearing assembly in accordance with this invention is shown in FIG. 1 and is generally designated there by reference number 10, and generally comprises hub 12, bearing pack 14, ABS sensor 15, and exciter ring 50.

Hub 12 defines a hollow passageway 16 including a splined cylindrical portion 18 which is adapted to receive a splined drive shaft which is typically provided with universal or constant velocity joints to enable hub and bearing assembly 10 to undergo suspension travel and steering movements. Hub and bearing assembly 10 shown in FIG. 1 is principally intended for applications for four-wheel drive vehicles, and in particular, for the front driven axle of such a vehicle. Hub 12 further defines a radially projecting wheel mounting flange 20 having a plurality of stud holes 22, with wheel mounting studs 24 installed therein. The outer cylindrical surface of hub 12 in-board of wheel mounting flange 20, is stepped and includes a reduced diameter portion 26 and a shoulder 29 between it and a still smaller diameter bearing pack mounting surface 28.

Bearing pack 14 is shown installed onto hub 12 in FIG. 1, and includes a pair of tapered roller bearings (cones) 30 having inner-races 32 with tapered roller elements 36. Bearing pack cup 38 defines the outer race surfaces for roller elements 36, and further includes a radially projecting flange 40 having mounting holes 42, enabling bearing pack 14 to be affixed to a steering knuckle or other suspension structure. Bearing pack 14 is a sealed type unit which is initially filled with grease during production and retains same within the bearing pack by grease seals 44 and 46. Bearing pack 14 is press-fit onto hub mounting surface 28 as shown in FIG. 1, abutting hub shoulder 29.

The hub and bearing assembly 10 in accordance with this invention includes an ABS sensor 15 and exciter ring 50. Exciter ring 50 is shown pressed onto hub cylindrical surface 26. Depending on the type of sensor used, exciter ring 50 may take various forms. For the sensor system used in the described embodiment, ring 50 is an iron ring of multiple tooth construction along its outer periphery. Sensor 15 is variable reluctance device having a permanent magnet with a wound copper coil suspended in a plastic medium. Accordingly, as exciter ring 50 is rotated relating to sensor 15 and emf is induced within the sensor. The frequency of the induced emf is proportional to vehicle wheel speed. By alternative construction an induced emf may be produced at wheel speeds approaching zero through the use of active sensors such as Hall effect type transducers.

Figure 2:
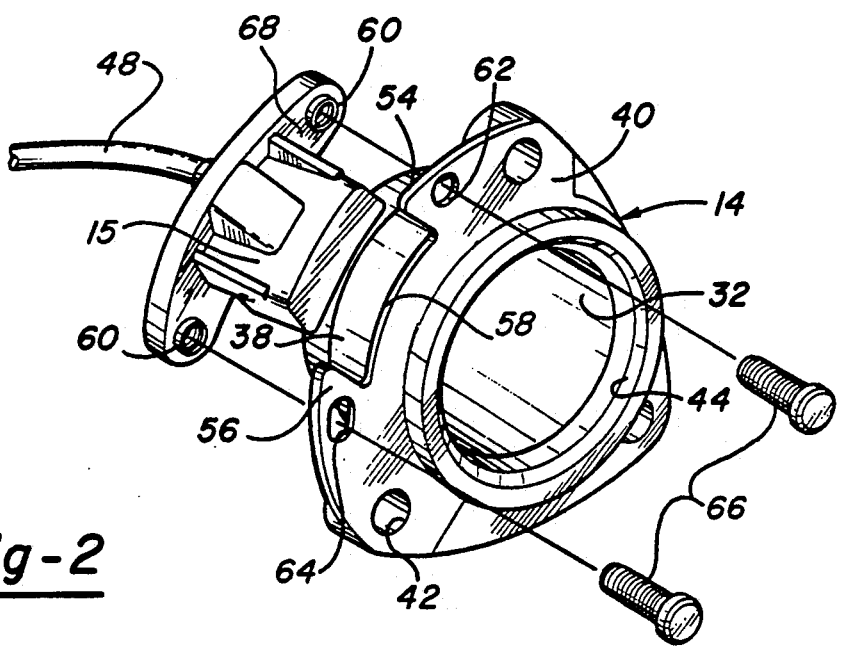
FIG. 2 is a pictorial view of the bearing shown with the ABS sensor exploded from the bearing mounting flange.

In accordance with a principle feature of the present invention, accurate positioning of sensor 15 with respect to exciter ring 50 is established through directly mounting the sensor to bearing pack mounting flange 40. As best shown in FIG. 2, bearing pack mounting flange 40 includes a pair of thin webs 54 and 56 with notch 58 formed therebetween, which serve as a mounting area for sensor 15. As also best shown in FIG. 2, sensor 15 includes a pair of projecting tubular bosses 60 which are internally threaded. Tubular bosses 60 are received by an accurately machined hole 62 and a slightly elongated hole 64. The purpose of providing elongated hole 64 is to accommodate slight tolerance variation in the dimensions between the centers of holes 62 and 64, and between sensor tubular bosses 60. One of bosses 60 closely fits into hole 62 to accurately positions sensor 15. Slot 64 is preferably elongated in the direction along a circumferential segment of a circle defined around the center of rotation of hub 12. Sensor 15 is held in position with mounting bolts 66 which pass through holes 62 and 64, and thread into tubular bosses 60. The height of tubular bosses 60 extending from clamping surface 68 of sensor 15 is less than the thickness of webs 54 and 56, enabling bolts 66 to draw sensor 52 into firm contact with the webs.

The design of hub and bearing assembly 10 accurately positions sensor 15 relative to exciter ring 50. For this configuration, the only components which affect the critical radial clearance between exciter ring 50 and sensor 15 are those two components themselves, along with bearing pack 14 and hub 12. With prior art designs, additional components are present which affect the radial clearance. Generally speaking, as the number of components which are connected together which affect a given tolerance or clearance increases, the more difficult it becomes to accurately set and maintain the clearance. For the present design of hub and bearing assembly 10, the radial clearance between exciter ring 50 and sensor 15 is set during assembly and fabrication of the assembly 10. Since this unit is provided as a sub-assembly component to the vehicle manufacturer, the vehicle manufacturer is assured that the sensor clearance has previously been established and is not affected by subsequent vehicle assembly.

While the above description constitutes the preferred embodiments of the present invention, it will be appreciated that the invention is susceptible of modification, variation and change without departing from the proper scope and fair meaning of the accompanying claims.

We claim:

1. A hub and bearing assembly for a motor vehicle of the type having an anti-lock braking system comprising:
    a hub having means for affixing a wheel thereto and defining a cylindrical surface,
    an exciter ring affixed to said hub and disposed on said cylindrical surface,
    a sensor for said anti-lock braking system for providing an output related to the rotation of said wheel and said hub, and
    a bearing pack for supporting said hub for rotation and including rolling bearing elements between at least one inner race coupled to said hub and at least one outer race coupled to a mounting flange, said mounting flange having means for mounting said bearing pack to a suspension structure and defining a pair of separated webs defining a notch therebetween with each of said webs defining an aperture for receiving mounting means for said sensor for directly engaging and mounting said sensor to provide a desired radial clearance between said exciter ring and said sensor.

2. A hub and bearing assembly according to claim 1 wherein said exciter ring is formed from iron and defines teeth along its outer periphery and said sensor is a variable reluctance type which produces an induced emf in response to rotation of said hub, with a frequency related to the speed of rotation of said hub.

3. A hub and bearing assembly according to claim 1 wherein said sensor defines a pair of projecting tubular bosses with at least one of said bosses being closely received by at least one of said apertures.

4. A hub and bearing assembly according to claim 1 wherein the components which define the radial clearance between said exciter ring and said sensor include only said exciter ring, said sensor, said hub and said bearing pack.

5. A hub and bearing assembly for a motor vehicle of the type having an anti-lock braking system comprising:
    a hub having means for affixing a wheel thereto and defining a cylindrical outer surface,
    an exciter ring affixed to said hub and disposed on said cylindrical outer surface, said exciter ring defining teeth along its outer periphery,
    a variable reluctance sensor for said anti-lock braking system which, when exposed to said exciter ring teeth upon rotation of said exciter ring relative to said sensor, provides an electrical output related to the speed of rotation of said wheel and said hub,
    a bearing pack for supporting said hub for rotation including rolling bearing elements between at least one race coupled to said hub and at least one outer race coupled to a mounting flange, said mounting flange having means for mounting said bearing pack to a suspension structure, said bearing pack mounting flange further defining a pair of webs having holes therethrough with a notch therebetween for receiving said sensor, and
    fasteners passing through said web holes for fastening said sensor to said hub mounting flange whereby the radial clearance between said exciter ring and said sensor is defined only by said sensor, said exciter ring, said hub and said bearing pack.

6. A hub and bearing assembly according to claim 5 wherein said sensor defines a pair of projecting tubular bosses with at least one of said bosses being closely received by at least one of said apertures.

* * * * *